US012501480B2

(12) United States Patent
Tirronen et al.

(10) Patent No.: US 12,501,480 B2
(45) Date of Patent: *Dec. 16, 2025

(54) METHOD FOR ALLOCATING RESOURCE GRANT

(71) Applicant: TELEFONAKTIEBOLAGET LM ERICSSON (PUBL), Stockholm (SE)

(72) Inventors: Tuomas Tirronen, Helsinki (FI); Andreas Höglund, Solna (SE); Emre Yavuz, Stockholm (SE); Dung Pham Van, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/668,006

(22) Filed: Feb. 9, 2022

(65) Prior Publication Data

US 2022/0174726 A1 Jun. 2, 2022

Related U.S. Application Data

(63) Continuation of application No. 16/764,546, filed as application No. PCT/IB2018/059023 on Nov. 16, 2018, now Pat. No. 11,291,040.
(Continued)

(51) Int. Cl.
*H04W 74/00* (2009.01)
*H04B 7/06* (2006.01)
(Continued)

(52) U.S. Cl.
CPC ........ *H04W 74/004* (2013.01); *H04B 7/0626* (2013.01); *H04L 1/0003* (2013.01);
(Continued)

(58) Field of Classification Search
None
See application file for complete search history.

(56) References Cited

U.S. PATENT DOCUMENTS 11,291,040 B2 * 3/2022 Tirronen .......... H04W 74/0833
2016/0135194 A1 5/2016 Kim
(Continued)

FOREIGN PATENT DOCUMENTS

IN 201727000804 A 2/2017
WO 2018185654 W 10/2018

OTHER PUBLICATIONS

3GPP TS 36.300 V14.3.0 (Jun. 2017), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14).
(Continued)

*Primary Examiner* — Anh Vu H Ly
(74) *Attorney, Agent, or Firm* — Ericsson Inc.

(57) ABSTRACT

A method for allocating a resource grant at a network node comprises receiving, from a user equipment (UE), a preamble message; providing, to the UE, at least two uplink resource grants in a system information message, wherein the at least two uplink resource grants have different sizes and are overlapping; and receiving, from the UE, a transmission via a first uplink resource grant selected from the at least two uplink resource grants. The method provides multiple and flexible grants for the UE to select a corresponding grant to perform an uplink transmission.

22 Claims, 17 Drawing Sheets

Related U.S. Application Data

(60) Provisional application No. 62/587,402, filed on Nov. 16, 2017.

(51) Int. Cl.

| | |
|---|---|
| *H04L 1/00* | (2006.01) |
| *H04L 5/00* | (2006.01) |
| *H04W 72/1263* | (2023.01) |
| *H04W 72/23* | (2023.01) |
| *H04W 80/02* | (2009.01) |
| *H04W 74/0833* | (2024.01) |

(52) U.S. Cl.
CPC ....... *H04L 5/0094* (2013.01); *H04W 72/1263* (2013.01); *H04W 72/23* (2023.01); *H04W 80/02* (2013.01); *H04W 74/0833* (2013.01)

(56) References Cited

U.S. PATENT DOCUMENTS

| | | | | |
|---|---|---|---|---|
| 2018/0368188 | A1* | 12/2018 | Aiba | H04W 74/0833 |
| 2019/0090266 | A1* | 3/2019 | Zhao | H04W 72/0446 |
| 2019/0159260 | A1* | 5/2019 | Charbit | H04W 74/0833 |
| 2019/0174571 | A1* | 6/2019 | Deenoo | H04W 76/28 |
| 2020/0037368 | A1* | 1/2020 | Höglund | H04W 72/23 |
| 2020/0187242 | A1* | 6/2020 | Höglund | H04W 72/1268 |
| 2020/0187245 | A1* | 6/2020 | Fujishiro | H04W 72/23 |
| 2020/0344818 | A1* | 10/2020 | Höglund | H04W 74/004 |

OTHER PUBLICATIONS

3GPP TS 36.331 V14.3.0, "3rd Generation Partnership Project; Technical Specification Group Radio Access Network; Evolved Universal Terrestrial Radio Access (E-UTRA); Radio Resource Control (RRC); Protocol specification (Release 14)", Jun. 2017.

3GPP, "3rd Generation Partnership Project; Technical Specification Group Radio Access Network; Evolved Universal Terrestrial Radio Access (E-UTRA); Medium Access Control (MAC) protocol specification (Release 14)", TS 36.321 V14.3.0, Jun. 2017.

3GPP, "3rd Generation Partnership Project; Technical Specification Group Radio Access Network; Evolved Universal Terrestrial Radio Access (E-UTRA); Physical layer procedures (Release 14)", TS 36.213 V14.3.0, Jun. 2017.

Ericsson et al. "Revised WID on Even further enhanced MTC for LTE" RP-171427, 3GPP TSG RAN Meeting #76, West Palm Beach, USA, Jun. 5-8, 2017.

Ericsson, "Early data transmission for efeMTC UEs," R2-1708628, 3GPP TSG-RAN WG2 #99, Berlin, Germany, Aug. 21-25, 2017.

Ericsson, "General aspects of early data transmission", R2-1710523, 3GPP TSG-RAN WG2 #99bis, Prague, Czech Republic, Oct. 9-13, 2017, 5 pages.

Huawei et al, "Revised WID on Further NB-IoT enchancements", 3GPP TSG RAN Meeting #76, RP-171428, Jun. 5-8, 2017, West Palm Beach, USA.

Nokia, et al., "Data transmission during random access procedure," R1-1717221, 3GPP TSG RAN WG1 Meeting #90bis, Prague, Czech Republic, Oct. 9-13, 2017.

Nokia, et al.., "Data transmission during random access procedure," R1-1717229, 3GPP TSG RAN WG1 Meeting #90bis, Prague, Czech Republic, Oct. 9-13, 2017.

Qualcomm Incorporated, Email discussion report: [99#45][NB-IoT/MTC] Early data transmission, R2-1710888 3GPP TSG-RAN WG2 Meeting #99bis, Prague, Czech Republic, Oct. 9-13, 2017.

Ericsson: "Data transmission during random access procedure for NB-IoT". 3GPP TSG-RAN WG1#90, R1-1712624. Prague, Czech Republic, Aug. 21-25, 2017.

ZTE: "Further consideration on early data transmission in eFeMTC and FeNB-IoT". 3GPP TSG-RAN WG2 Meeting#99, R2-1710987 Prague, Czech, Oct. 9-13, 2017.

* cited by examiner

METHOD FOR ALLOCATING RESOURCE GRANT

RELATED APPLICATIONS

This Application is a Continuation of U.S. application Ser. No. 16/764,546, filed May 15, 2020, which is a 371 of International Application No. PCT/IB2018/059023, filed Nov. 16, 2018, which claims the benefit of U.S. Application No. 62/587,402, filed Nov. 16, 2017, the disclosures of which are fully incorporated herein by reference.

TECHNICAL FIELD

Particular embodiments relate to the field of allocating resource grant; and more specifically, to methods, and apparatus for allocating multiple uplink resource grants for a user equipment.

BACKGROUND

There has been a lot of work in 3GPP lately on specifying technologies to cover Machine-to-Machine (M2M) and/or Internet of Things (IoT) related use cases. Most recent work for 3GPP Release 13 and 14 includes enhancements to support Machine-Type Communications (MTC) with new UE categories, as in Cat-M1, Cat-M2, supporting reduced bandwidth of up to 6 and 24 physical resource blocks (PRBs), and Narrowband IoT (NB-IoT) UEs providing a new radio interface, with UE categories Cat-NB1 and Cat-NB2.

The LTE enhancements introduced in 3GPP Release 13, 14, and 15 for MTC would be referred as "eMTC", including but not limited to support for bandwidth limited UEs, Cat-M1/M2, and support for coverage enhancements. This is to separate discussions from NB-IoT used for any Release, although the supported features are similar on a general level.

For both eMTC and NB-IoT, Cellular IoT EPS User Plane optimization and Cellular IoT EPS Control Plane optimization signaling reductions were also introduced in Release 13. The former, here referred to as UP-solution, allows the UE to resume a previously stored RRC connection, thus also known as RRC Suspend/Resume. The latter, here referred to as CP-solution, allows the transmission of user-plane data over non-access stratum, i.e. DoNAS.

For 3GPP Release 15, new work items (WIs) for Even further enhanced MTC for LTE (LTE_eMTC4) and Further NB-IoT enhancements (NB_IOTenh2) target eMTC and NB-IoT enhancements, respectively. The new WIs for LTE_eMTC4 here is referred to as WI_eMTC, and the new WIs for NB_IOTenh2 here is referred as WI_NBIOT. In both of these, one of the goals for a WI is to reduce UE power consumption and latency through introducing possibilities to send data as early as possible during the Random Access (RA) procedure.

WI_eMTC supports early data transmission and evaluates power consumption, latency gain, and specifies necessary support for downlink (DL)/uplink (UL) data transmission on a dedicated resource during the RA procedure, e.g. after physical random access channel (PRACH) transmission and before the RRC connection setup is completed, at least in the RRC Suspend/Resume case.

WI_NBIOT evaluates power consumption, latency gain, and specifies necessary support for DL/UL data transmission on a dedicated resource during the RA procedure, after NPRACH transmission and before the RRC connection setup is completed.

During RAN2 #99, several contributions on early data transmission (EDT) were discussed, and one of the agreements is to support early UL data transmission in Msg4 for both Release 13 user plane (UP) and control plane (CP) solutions.

During recent RAN2 #99-Bis, a significant progress has been made. Among others, there is an agreement regarding the UL grant size for Msg3. Maximum possible grant size for Msg3 is broadcast per CE. It requires further study in the future if the UE indicates the grant size for Msg3 it needs via PRACH partitioning.

FIG. 1 illustrates a contention-based RA procedure from TS 36.300. The messages in the RA procedure are commonly referred to as message 1 (Msg1) through message 4 (Msg4).

The structure of MAC layer protocol data units (PDUs) are defined in TS36.321. The structure of the grant included in the MAC RAR is defined in TS36.213. Currently, in LTE, it is not possible to send uplink or downlink user plane data before the contention based random access procedure has been completed, that is not before message 4 (Msg4) has been transmitted by the eNB and successfully received by the UE.

As the random access procedure is the method for the UE to get dedicated network resources and make its identity known to the eNB, the eNB does in general not know in advance the UE identity until after contention has been resolved. Also, the eNB doesn't know the capabilities of the UE, thus a method for sending early data cannot rely on the eNB knowing which type of UEs have initiated the random access procedure and if they support early data transmission or not.

WO 2018/185654A1 outlines a solution to this problem, where the eNB provides two UL grants to the UE accessing the system in Msg2. This first grant is to be used by Release 13 and 14 UEs for continuing the connection set up, while the second grant is intended to support connection setup and early data transmission for UEs capable of this new feature. This solution will introduce new requirements on the eNB. The eNB is required to blindly detect which of the two grants the UE responded to. Dual grants may also lead to a waste of UL radio resources, as the UE may only use one out of the two allocated uplink grants.

In some solutions, dual UL grant is further improved in the sense that a UE which is capable of early data transmission selects one of the two provided grants and transmits using uplink resources provided by one or both of them. Using the resources provided by the first grant, the UE can indicate whether it intends to use the second grant. Furthermore, UEs not supporting this feature, e.g. Release 13 and 14, are not able to comprehend any new formats specified after Release 14, and therefore, the messages and the random access procedure may only be changed in a backwards compatible manner.

An improvement on top of the dual grant operation for early data transmission includes possible ways to minimize the overhead in the dual grant transmission. Particularly, the size of the second grant may be minimized based on the information provided in the first grant.

In existing solutions, the UE may indicate its intention of using EDT by selecting a preamble to transmit in Msg1. In Msg2, which is a response to Msg1, eNB may provide an additional UL grant to the UL grant provided for the legacy transmission, so that user data may also be transmitted along with control signaling in Msg3, i.e., so-called dual grant. This is assuming that it is not possible for the eNB to know, based on the received preamble, whether the UE intends to use EDT or not. If this was known, another alternative would be to provide a single UL grant, but larger than the usual in legacy for a UE that indicates to use EDT.

Regardless of whether the eNB provides single or multiple grants to a UE for Msg3 based on the early data transmission (EDT) indication, network resources may be wasted depending on how well the grant size fits to the data transmitted in the UL.

SUMMARY

To address the foregoing problems with existing solutions, disclosed are methods, a user equipment (UE), and a network node for allocating uplink grant by providing multiple grants with different sizes for the UE. The present disclosure implements a solution to enable the UE to select an appropriate grant which is corresponding to the size of uplink transmission, such that the resources in the network is not wasted.

Several embodiments are elaborated in this disclosure. According to one embodiment, a method for allocating a resource grant at a network node comprises receiving, from a user equipment (UE), a preamble message. The method additionally comprises providing, to the UE, at least two uplink resource grants in a system information message, wherein the at least two uplink resource grants have different sizes and are overlapping. The method further comprises receiving, from the UE, a transmission via a first uplink resource grant selected from the at least two uplink resource grants.

In one embodiment, the at least two uplink resource grants comprise the first uplink resource grant and a second uplink resource grant.

In one embodiment, the first uplink resource grant comprises at least one of the following: uplink subcarrier spacing; subcarrier indication; scheduling delay; repetition number; and modulation and coding scheme (MCS) index which indicates transport block size (TBS), modulation, and number of resource units (RUs).

In one embodiment for NB-IoT, the second uplink resource grant comprises at least one of the following: subcarrier indication; scheduling delay; repetition number; and modulation and coding scheme (MCS) index which indicates TBS, modulation, and number of RUs.

In one embodiment for eMTC, the second uplink resource grant comprises at least one of the following: physical uplink shared channel (PUSCH) narrowband index; PUSCH resource allocation; number of repetitions for PUSCH; MCS; TBS; transmit power control (TPC); channel state information (CSI) request; uplink delay; and MTC physical downlink control channel (MPDCCH) narrowband index.

In one embodiment, the UE is a UE which intends to use early data transmission. In another embodiment, the UE is a legacy UE which does not use lager size of grant.

In one embodiment, at least one field in the first uplink resource grant is inherited by the second uplink resource grant. In another embodiment, fields in the second uplink resource grant which are not inherited from the first uplink resource grant are presented by using unused bits in medium access control (MAC) protocol data unit (PDU) for the system information message.

In one embodiment, a number of bits used in the first uplink resource grant is less than a number of bits used in the second uplink resource grant. The first uplink resource grant is used for legacy and the second uplink resource grant which overlaps with legacy resources is used for early data transmission.

According to another embodiment, a method for allocating a resource grant in a network comprises sending, from a UE to a network node, a preamble message. The method additionally comprises receiving, at the UE from the network node, at least two uplink resource grants in a system information message, wherein the at least two uplink resource grants have different sizes and are overlapping. The method further comprises selecting, at the UE, a first uplink resource grant from the at least two uplink resource grants, wherein a size of the first uplink resource grant is corresponding to a size of a first transmission. The method yet further comprises transmitting, from the UE to the network node, the first transmission.

In one embodiment, the method further comprises selecting a second uplink resource grant from the at least two uplink resource grants, wherein a size of the second uplink resource grant is corresponding to a size of a second transmission.

In one embodiment, fields in the second uplink resource grant become dependent on the first uplink resource grant as the UE receives the first uplink resource grant.

In one embodiment, the scheduling delay in the second uplink resource grant is with respect to an end of first transmission plus a specific time offset or after the UE confirms that the first transmission has been received by the network node. In another embodiment, the specific time offset is 3 ms.

In one embodiment, the network enables a specific scheduling delay between the first uplink resource grant and the second uplink resource grant.

According to yet another embodiment, a network node for allocating a resource grant in a network, comprises at least one processing circuitry, and at least one storage that stores processor-executable instructions, when executed by the processing circuitry, causes the network node to receive, from a UE, a preamble message; provide, to the UE, at least two uplink resource grants in a system information message, wherein the at least two uplink resource grants have different sizes and are overlapping; and receive, from the UE, a transmission via a first uplink resource grant selected from the at least two uplink resource grants.

According to further another embodiment, a user equipment for allocating a resource grant in a network comprises at least one processing circuitry, and at least one storage that stores processor-executable instructions, when executed by the processing circuitry, causes the user equipment to send, to a network node, a preamble message; receive, from the network node, at least two uplink resource grants in a system information message, wherein the at least two uplink resource grants have different sizes and are overlapping; select a first uplink resource grant from the at least two uplink resource grants, wherein a size of the first uplink resource grant is corresponding to a size of a first transmission; and transmit, to the network node, the first transmission.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may provide a UE with multiple and flexible resource grants, so that the UE may select a resource grant to perform an uplink transmission based on the type of the UE or the size of the transmission. Therefore, a waste of resource may be avoided.

The present embodiments provide a dual-grant method to save resources in the network. When the UE selects or receives the first grant among the dual grants, the fields in the second grant may be dependent on the first grant. Thus, the present embodiments help reducing the downlink system overhead.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
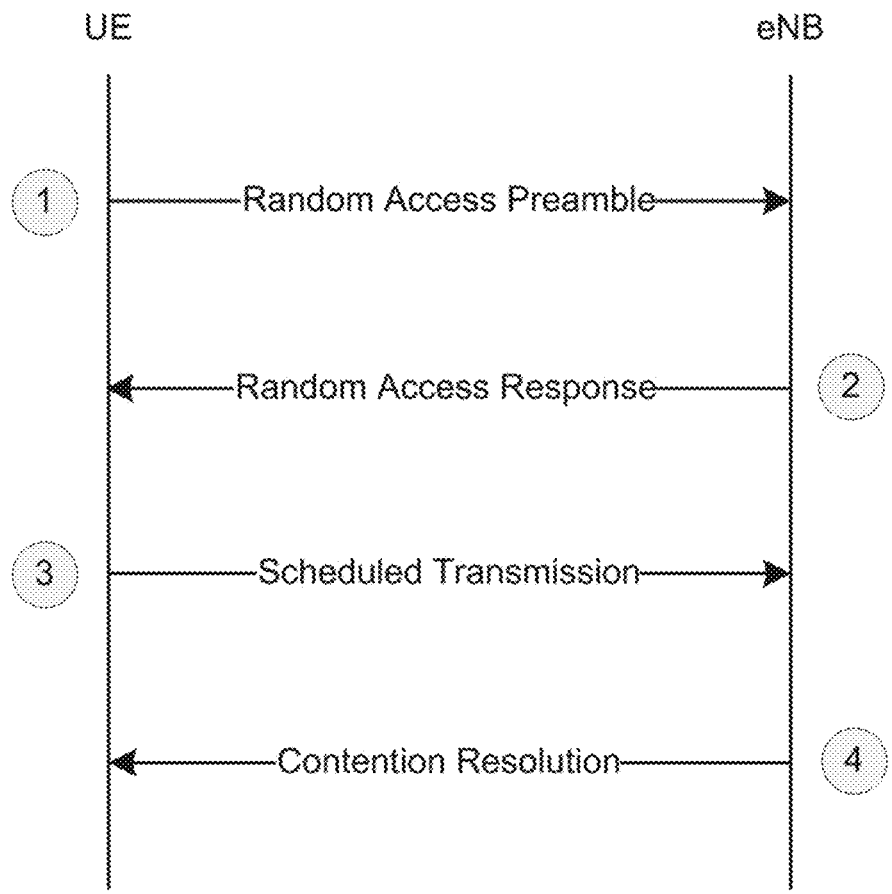
FIG. 1 illustrates an example contention-based random access procedure.

In 3GPP radio access networks, when messages transmitted in a connection establishment are used to indicate a UE to use early data transmission (EDT), a resource waste may be caused because it is not possible to send uplink or downlink user plane data before the connection establishment has been completed. Even with the existing solutions, network resources may still be wasted because that the UE might not be able to utilize all UL grants provided by the network or the size of the transmission might not fit size of the UL grant. Therefore, particular embodiments of the present disclosure propose a method to provide multiple UL grants which have different sizes and are overlapping for a UE, such that the UE may be able to select an appropriate UL grant by adding padding bits in the UL grant, and thus minimize a number of repetitions required. The UE selects the UL grant, and its size corresponds to a size of transmission to avoid a resource waste.

In the case that the network does not know explicitly that a UE intends to do EDT based on the random access preamble (Msg1), particular embodiments provide a backwards compatible and an optimized mechanism during connection establishment to avoid wasting network resources by providing suitable, flexible grants. Particular embodiments are valid for LTE, LTE-M, and NB-IoT, and it may also be considered as valid for 5G/NR. Furthermore, the UL grant which is not selected or received by the UE may become dependent on the UL grant being selected, and thus, the size of the UL grant which is not selected will be reduced to ease the downlink system overhead. Therefore, the network may benefit from better resource usage and reduced power consumption.

Particular embodiments may be considered as an improvement on the resource allocation solution. Particular embodiments optimize the allocated network resources and the content of the random access response (RAR) message, where UL grant is provided for early data transmission (EDT) in Msg3. Specifically, particular embodiments help minimize the overhead in RAR message and the size of the network resources allocated for transmitting Msg3 in the UL by providing flexible grant sizes that partially overlap in time and/or frequency. Therefore, when the UE selects a grant smaller than the maximum possible UL grant provided in Msg2, the overlapping part may be saved. Another benefit of particular embodiments is for the UE to use relatively less number of padding bits, in case it is possible to transmit using a smaller UL grant provided with such flexible means.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The present disclosure illustrates example methods which apply to two scenarios below: (1) The indication for EDT is provided via legacy way of partitioning; and (2) No indication for EDT is provided or some preambles are shared between legacy UEs and UEs that support EDT to initiate the random access procedure to access the network. In certain embodiments, the legacy way of partitioning may be using the legacy mechanism with further partitioning per coverage enhancement (CE) with respect to EDT indication. In certain embodiments, no indication for EDT being provided means that the eNB needs to find out blindly if a UE intends to use EDT or not.

Figure 2:
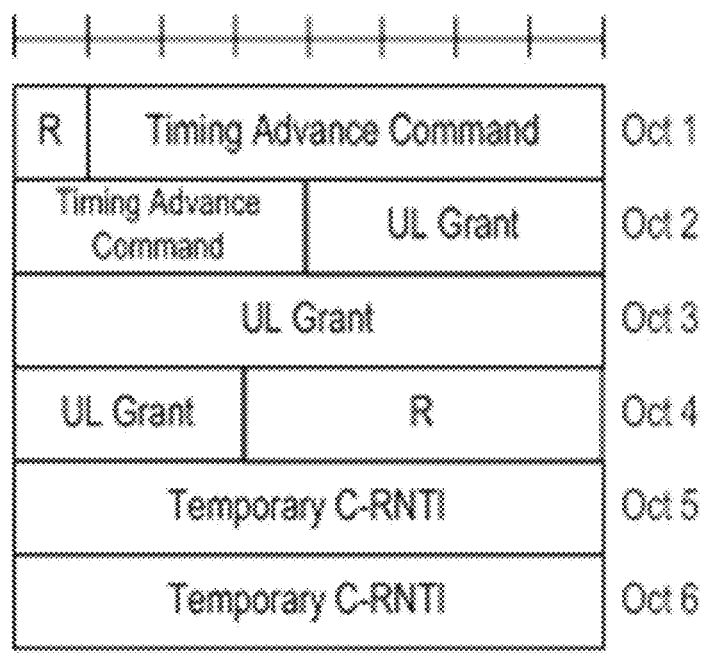
FIG. 2 illustrates an example random access response message, in accordance with certain embodiments.

FIG. 2 illustrates an example RAR message for NB-IoT UEs, in accordance with certain embodiments. In the former case mentioned above, since the eNB would know whether the UE supports EDT and intends to transmit data in Msg3, the eNB may send a RAR message with an UL grant using a new format. Depending on the resolution that RAN2 agrees on, one embodiment may either use the existing reserved entries in the MCS index table with a set of TB sizes or extend the table with the reserved bits in Msg2 for a higher resolution of TB sizes. Another embodiment may be adding another byte to the existing message, i.e. Msg2. In certain embodiments, one or more UL grants may be provided in a system information message or any other suitable message sent from eNB to the UE.

The present disclosure addresses how the UL grant is prepared based on the text from TS 36.231.

Regarding narrowband random access response grant, the higher layers indicate the Nr-bit UL Grant to the physical layer, as defined in 3GPP TS 36.321 [8]. This is referred to as the Narrowband Random Access Response Grant in the physical layer.

Nr-bit=15, and the content of these 15 bits starting with the MSB and ending with the LSB are as follows:

Uplink subcarrier spacing $\angle f$ is '0'=3.75 kHz or '1'=15 kHz—1 bit

Subcarrier indication field $I_x$ as determined in Subclause 16.5.1.1—6 bits

Scheduling delay field ($I_{Delay}$) as determined in Subclause 16.5.1 with $k_0$=12 for $I_{Delay}$=0, where NB-IoT DL subframe n is the last subframe in which the NPDSCH associated with the Narrowband Random Access Response Grant is transmitted—2 bits Msg3 repetition number $N_{RU}$ as determine in Subclause 16.5.1.1—3 bits MCS index indicating TBS, modulation, and number of RUs for Msg3 according to Table 1—3 bits The redundancy version for the first transmission of Msg3 is 0. Refer to the MCS index in Table 1 and transport block size in Table 2 provided below for detailed information.

TABLE 1

MCS index for Msg3 NPUSCH

| MCS Index $I_{MCS}$ | Modulation $\Delta f$ = 3.75 kHz or $\Delta f$ = 15 kHz and $I_{lc}$ – 0, 1, . . . , 11 | Modulation $\Delta f$ = 15 kHz and $I_{lc}$ > 11 | Number of RUs $N_{RU}$ | TBS |
|---|---|---|---|---|
| '000' | pi/2 BPSK | QPSK | 4 | 88 bits |
| '001' | pi/4 QPSK | QPSK | 3 | 88 bits |
| '010' | pi/4 QPSK | QPSK | 1 | 88 bits |
| '011' | reserved | reserved | reserved | reserved |
| '100' | reserved | reserved | reserved | reserved |
| '101' | reserved | reserved | reserved | reserved |
| '110' | reserved | reserved | reserved | reserved |
| '111' | reserved | reserved | reserved | reserved |

TABLE 2

Transport block size (TBS) for NPUSCH

| | $I_{RU}$ | | | | | | | |
|---|---|---|---|---|---|---|---|---|
| $I_{TBS}$ | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | 1224 |
| 8 | 120 | 256 | 392 | 536 | 680 | 808 | 1096 | 1384 |
| 9 | 136 | 296 | 456 | 616 | 776 | 936 | 1256 | 1544 |
| 10 | 144 | 328 | 504 | 680 | 872 | 1000 | 1384 | 1736 |
| 11 | 176 | 376 | 584 | 776 | 1000 | 1192 | 1608 | 2024 |
| 12 | 208 | 440 | 680 | 1000 | 1128 | 1352 | 1800 | 2280 |
| 13 | 224 | 488 | 744 | 1128 | 1256 | 1544 | 2024 | 2536 |

Considering that RAN2 has agreed the following: "Maximum possible grant size for Msg3 is broadcast per CE", it may be easier to indicate the TB sizes with respect to their proportionality to the broadcast value to save some signaling bits. For example, maximum possible grant size for Msg3 is k and in Table 1 for MCS index, it indicates k/2, k/3, k/4, and k/6, etc. for TBS.

In one embodiment, the UE may choose a TBS out of such set which best fits the data in its UL data buffer. How to derive the set of possible TBSs, e.g. {k/4, k/2, k}, may be configured in system information, or hard coded in specification, e.g. if k*{¼, ½, 1} or {⅓, 1} may be considered. It is also possible to use the existing 3 MCS bits in this embodiment since it would be a new format.

Even though the network would know that a UE intends to use EDT in Msg1, it may choose to allocate flexible UL grants sizes, so that the size of the UL grant may fit better to the size of the data which UE intends to transmit in Msg3. In other words, Msg3 may comprise padding bits, and thus number of repetitions required may be minimized. This would also mean a reduction in power consumption, and it may also require blind decoding over TBSs in eNB.

In one embodiment, the network may provide two partially overlapping grants in time and/or frequency with the same modulation, scheduling delay, and number of RUs, but different TBS sizes and "Msg3 repetition number". In another embodiment, number of RUs may be different but with the same repetition numbers, etc.

In one embodiment, a flexible grant size may be provided as a map from different MCS indices to different set of grant sizes, that is, one MCS value in UL grant would correspond, for example, to three different grant or TB size values, such as maximum supported TBS, half of the maximum supported TB S, one fourth of the maximum supported TBS, or some other range of maximum supported TBS. The UE would select and transmit with TBS which best fits the data, and eNB would do blind detection based on the signaled MCS set.

This embodiment may be generalized to cover n different TB sizes, and the calculation of the sizes may be based on the maximum possible grant/TB size, or some other value which is either signaled or fixed in the specifications.

Figure 3:
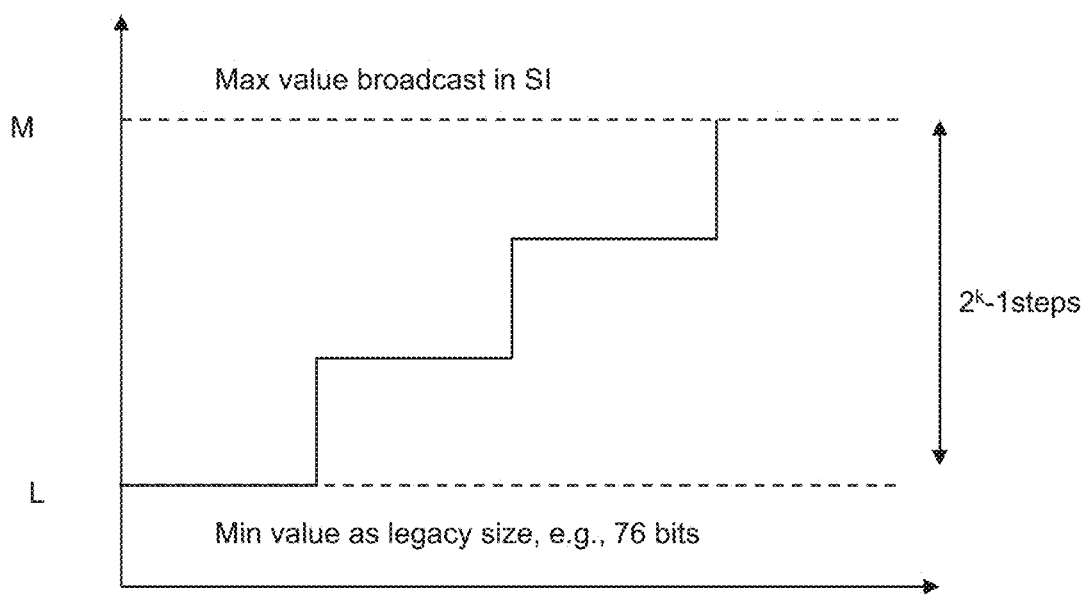
FIG. 3 illustrates an example uplink grant size for Msg3, in accordance with certain embodiments.

FIG. 3 illustrates an example diagram in calculation of UL grant size, in accordance with certain embodiments. The calculation of different allowed TB sizes may be done proportionally, as in the embodiment above, or the sizes may be spaced with some defined granularity, e.g. every 100 bytes. In yet another example, the sizes would be spaced between some lower and upper limit based on the number n, e.g. if the lowest grant is 100 bytes and the largest grant is 500 bytes, and 5 different sizes would be used, the spacing would be (500−100)/(5−1)=100 bytes, and levels 100, 200, 300, 400 and 500 would be used. As another embodiment, the network may take into account both the maximum possible TBS and the legacy TBS for Msg3 in determining the grant sizes in Msg2 using a step function, as illustrated in FIG. 1. In this case, the number of steps can be broadcast to UEs in system information. The value of steps can be determined by the network taking into account the trade-off between the resolution of TBS sizes and the overhead incurred in Msg2. For example, if current MSC index table is used, 5 reserved entries may be used as 5 steps corresponding to 5 values of TBS.

In another embodiment, the UL grants with varying TBSs share the same start position and overlap in frequency but vary in how long they are extended in time. For NB-IoT, for example, the different sizes of the UL grants may correspond to different number of resource units (RU) over which the TB is spread. That is, in legacy operation one TB may be spread over several RU as marked in Table 3 below.

TABLE 3

MCS index using $I_{TBS}$ as example

| $I_{TBS}$ | $I_{RU}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| *3* | *40* | *104* | *176* | *208* | *256* | *328* | *440* | *568* |
| 4 | 56 | 120 | 208 | 258 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | |
| 8 | 120 | 256 | 392 | 536 | 680 | 808 | | |
| 9 | 136 | 296 | 456 | 616 | 776 | 936 | | |
| 10 | 144 | 328 | 504 | 680 | 872 | 1000 | | |
| 11 | 1765 | 376 | 584 | 776 | 1000 | | | |
| 12 | 208 | 440 | 680 | 1000 | | | | |

The value of $N_{RU}$ corresponding to $I_{RU}$ is shown in Table 4 below.

TABLE 4

Chart of $N_{RU}$ and $I_{RU}$ value

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

That is, a TBS may be transmitted in 1 subframe up to 10 subframes. In this embodiment, the different UL grant sizes would correspond to a varying number of RUs for a certain I_TBS. Note that the I_TBS is determined by the channel quality, and based on a given I_TBS for the UE, the eNB may process one simultaneous decoding process but with different end points. That means a number of RUs corresponding to different decoding hypothesis. This would significantly reduce the burden from blind decoding in the eNB. For example, the set of flexible TBS may be I_RU={0, 1, 3, 6}, if a UE then has I_TBS=3, it may select any TBS for the Msg3 transmission in the set {40, 104, 208, 440} bits. The eNB would simply start accumulating the RUs and evaluating after 1, 2, 4, and 8 to see if it may successfully decode the TB. Therefore, this embodiment keeps only one buffer.

In the latter scenario, in which the eNB would not know for sure if the UE intends to transmit data in Msg3, it would be good if the eNB provides multiple and overlapping grants in time and/or frequency and leave them up to the UE to choose one for transmission. The network may then blindly decode the transmission. A similar grant allocation to the embodiment described above would also work in this latter scenario. Note that the legacy will only be able to use the UL grant provided based on the legacy values given in Table 2 and Table 4 above, where a UE that intends to use EDT would be able to use an UL grant with a larger size which overlaps the legacy resources. Note that the overlapping UL grants are never used simultaneously. The grants are either used by a legacy UE or a UE that intends to use EDT.

Using NB-IoT system as an example, in the embodiment providing multiple flexible grants, the first grant may include these fields that presents in the release 13 random access response. These fields in the first field may comprise uplink subcarrier spacing, subcarrier indication field, scheduling delay field, Msg3 repetition number, and MCS index indicating TBS, modulation, and number of RUs for Msg3, to achieve backward compatibility. As the UE has already received the first grant, the fields in the second grant may be dependent on the first grant. This helps reducing the size of the second grant, which, in turn, reduces the DL system overhead.

Figure 4:
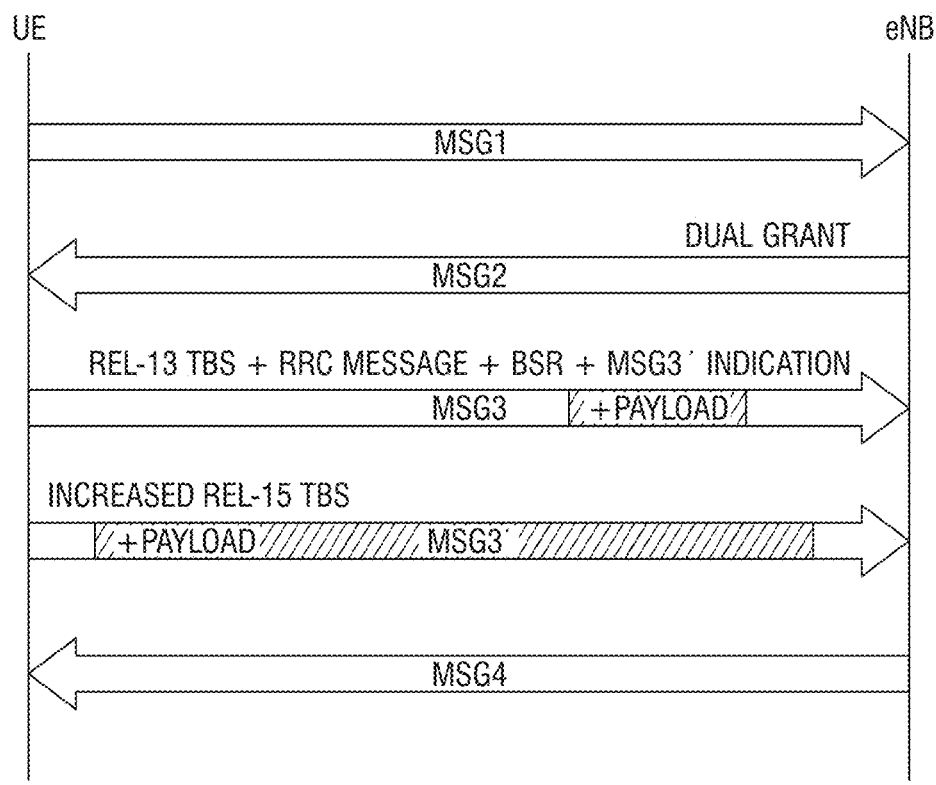
FIG. 4 illustrates a flow diagram of an example signaling of dual uplink grant in Msg3, in accordance with certain embodiments.

FIG. 4 illustrates an example signaling of dual uplink grant in Msg3, in accordance with certain embodiments. Since the radio conditions are estimated by using the preamble (Msg1) sent by the UE, it may be that similar modulation scheme and/or number of repetitions, and/or code rate are applicable for both UL messages. In certain embodiments, dual UL grant may be provided in Msg2, a system information message or any other suitable message sent from eNB to the UE.

In one of the embodiments, some of the fields in the first UL grant, which is UL grant 1 in FIG. 3, are either implicitly, explicitly inherited, or partially inherited by the second UL grant, which is UL grant 2 in FIG. 3. One embodiment is that subcarrier spacing and the repetition information sent for UL grant 1 may fully or partially be reused for the second grant.

In one of the embodiments, the number of bits used by the second UL grant may be less than the number of bits used by first UL grant. The number of bits used by the first UL grant may be 15 bits for NB-IoT and 12 or 20 bits for eMTC, and the number of bits used for the second UL grant would thus be less than this.

In one of the embodiments for NB-IoT, the second UL grant may include at least one of the following fields: 'Subcarrier indication field', 'Scheduling delay field', 'Msg3 repetition number', and 'MCS index indicating TBS, modulation, and number of RUs for Msg3'.

In one of the embodiments for eMTC, the second UL grant may include at least one of the following fields: 'Msg3 PUSCH narrowband index', 'Msg3 PUSCH resource allocation', 'Number of repetitions for Msg3 physical uplink shared channel (PUSCH)', 'MCS', 'TBS', 'TPC', 'channel state information (CSI) request', 'UL delay', and 'Msg3/Msg4 MTC physical downlink control channel (MPDCCH) narrowband index'.

In one of the embodiments, the second UL grant's fields not inherited from the first UL grant may be presented by using unused bits in the MAC PDU for the random access response message. In certain embodiments, the unused bits may comprise reserved bits in the MAC PDU header and in MAC RAR, and/or padding bits.

In one of the embodiments, the interpretation of fields in the second UL grant may depend on the fields used in the first UL grant. For example, the TBS of the second UL grant may be a predefined or configured number of steps in the TBS selection table larger than the TB S of the first UL grant.

In one of the embodiments, the uplink subcarrier spacing may not be presented in the second grant. In one embodiment, the subcarrier spacing of the second UL grant may be implicitly the same as for the first UL grant.

In one of the embodiments, the same modulation scheme may be used for both UL transmissions, and the modulation scheme may be only signaled in the first UL grant. In one embodiments, the MCS index of the second UL grant may be implicitly the same as for the first UL grant, regardless if MCS tables used in the 2nd UL grant may be different than the one used in the first UL grant.

In one of the embodiments, the same number of repetitions may be used for both UL transmissions, and the number of repetitions may be only signaled in the first UL grant.

In one of the embodiments, the same number of RUs may be used for both UL transmissions, and the number of RUs may be only signaled in the UL grant.

In one of the embodiments, the same subcarrier allocation field $I_{sc}$ may be used for both UL transmissions, and the number of allocated subcarriers may be only signaled in the UL grant.

In one of the embodiments, there is a field in the first UL grant in a backwards compatible way indicating that the same setting of modulation, allocated subcarriers $I_{sc}$, number of RUs, TBS, and number of repetitions is used for the second transmission. If this field is present or set to be true in a 0 or 1 manner, the UE may simply apply the same settings in the second UL transmission as indicated in the first UL transmission.

In one of the embodiments, there is a field which indicates which values of individual parameters, or set of parameters, in the second grant being the same as in the first grant, the field consists of at least one bit. This field may be in the second UL grant or encoded in the unused/reserved/padding fields of the RAR message in the MAC PDU. In one example, there is a bit pattern or bit field of 5 bits, each bit corresponding to one of the parameters listed above. A bit set to '1' would indicate the information is changed, and '0' that the same value is used for the second grant or vice versa, '0' indicating change and '1' indicating the same value. In one embodiment, the changed information may be encoded after this field, for example, if only the MCS index is changed, then bit pattern '00001' would be followed by the new MCS index of three bits. The bit pattern may also be shorter than 5 bits if the mapping between the bits and the parameters is elsewhere specified or configured using RRC signaling. In one embodiment, one bit may be used to indicate changes in more than one value. In another embodiment corresponding to the embodiment above, one bit may be used to indicate the same UL grant settings for the second UL transmission.

In one of the embodiments, the value of TBS of the second grant may be indicated in one of the following ways. Firstly, the value of TBS of the second grant may be indicated by using a field or one bit in the second UL grant to either explicitly or implicitly indicate the same MCS and TBS as in the 1st UL grant is used. Secondly, the TBS in the second UL grant may be defined incrementally with respect to the TBS indicated in the first UL grant. Thirdly, the value of TBS of the second grant may be indicated by using a pre-defined offset to the TBS of the first grant, which may be provided to UEs in system information broadcast. Lastly, the second TBS may be defined as a pre-defined, linear function of the first TBS of the 1st UL grant, with the variable being coded using unused bits in the MAC PDU for the random access response message.

In one of the embodiments, the scheduling delay field in the UL grant 2 may be with respect to the end of the first UL Msg3 transmission or after the UE confirms that UL Msg3 transmission has been successfully received. In this manner, the scheduling delay for UL grant 2 may be implicit and the same as for UL grant 1.

In one of the embodiments, the network may enable a fixed scheduling delay between the two UL Msg3 transmissions, e.g., through broadcast of SI or dedicated signaling. If the network enables a fixed scheduling delay, there is no scheduling delay field present in the second UL grant.

In one of the embodiments, the scheduling delay field in the second UL grant may be with respect to the end of the first UL Msg3 transmission.

In one of the embodiments, the scheduling delay field in the second UL grant may be with respect to the end of the first UL Msg3 transmission plus a time offset of X ms. That is, the Msg3 and Msg3' in the UL transmission are at least X ms apart, where X may be, for example, equal to 3 ms.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, in some embodiments, generic terminology "network node" is used. It can be any kind of network node which may comprise of a radio network node such as base station, radio base station, base transceiver station, base station controller, network controller, multi-standard radio BS, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment.

The term "radio node" used herein may be used to denote a UE or a radio network node.

The term "signaling" used herein may comprise any of: high-layer signaling (e.g., via radio resource control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Regarding naming message and numbering, sometimes messages corresponding to e.g., RRCConnectionResumeRequest, RRCConnectionResume and RRConnectionResumeComplete etc. are referred to in terms of where they occur in a random access sequence. As an example, in LTE, the messages RRCConnectionResumeRequest, RRCConnectionResume and RRConnectionResumeComplete correspond to messages 3, 4 and 5 in a random access procedure. Hence, they are often referred to as Msg3, Msg4 and Msg5, respectively. Same or similar or analogous naming is often used also in the context of NR and may, with or without some adaptations, be used also in the context of other access technologies and/or systems.

Figure 5:
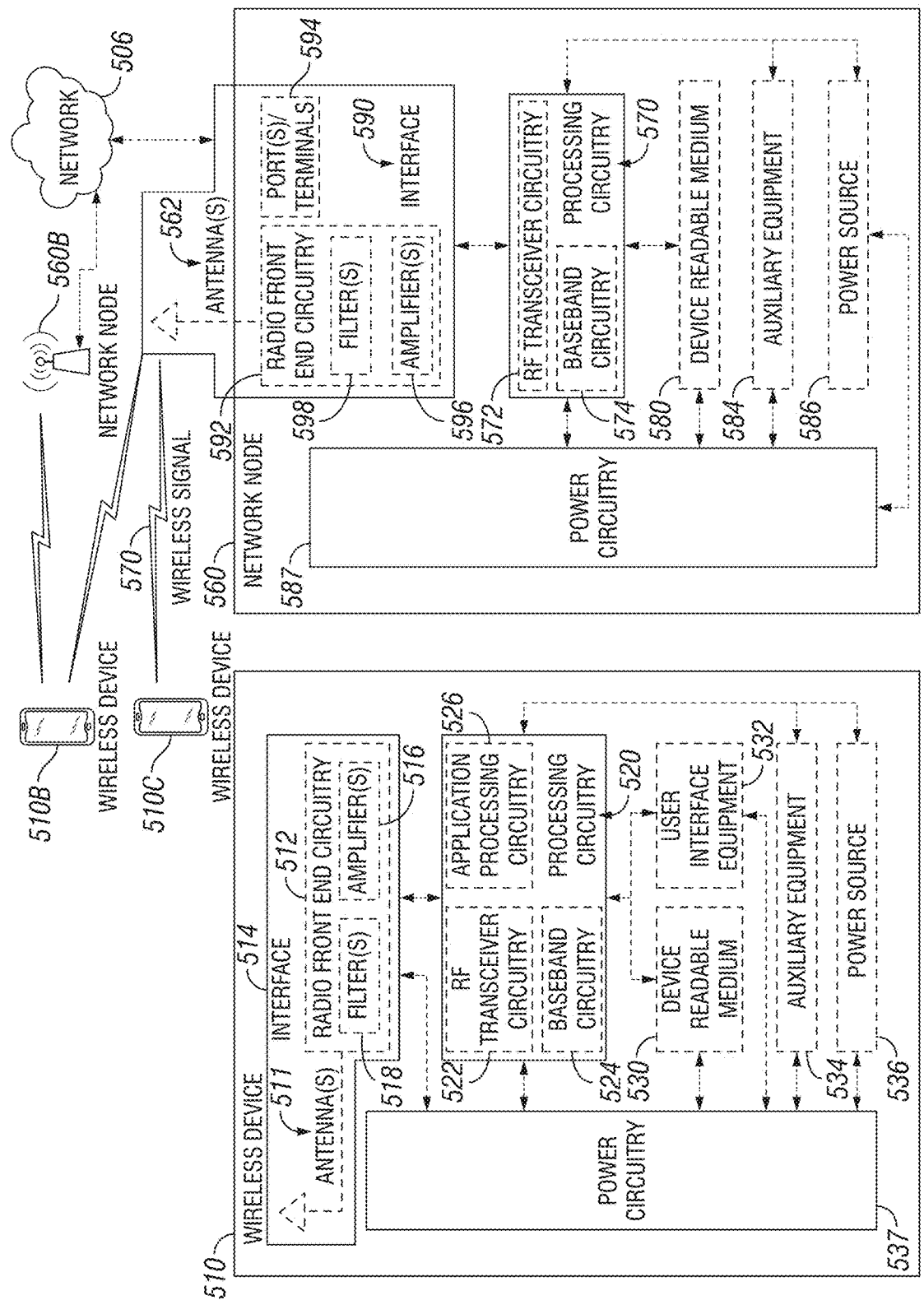
FIG. 5 illustrates an example wireless network, according to certain embodiments.

FIG. 5 is an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and wireless devices (WDs) 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. In certain embodiments, the network node 560 may be the network node which is further depicted in FIG. 16. In some embodiments, the network node 560 may be a base station, such as gNB. In certain embodiments, the wireless device 510 may be a user equipment, which is further illustrated in FIG. 15. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 588, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination. In particular embodiments, the processing circuitry 570 of the network node 560 may perform the methods, which are further illustrated in FIG. 14.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner In any of those embodiments, whether executing instructions stored on a device readable storage medium or not, processing circuitry 570 can be configured to perform the described functionality. The benefits provided by such functionality are not limited to processing circuitry 570 alone or to other components of network node 560 but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signaling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 510 may be a user equipment which is further depicted in FIG. 15. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein. In particular embodiments, the processing circuitry 520 of the wireless device 510 may perform the method which is further illustrated in FIG. 13.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionalities described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
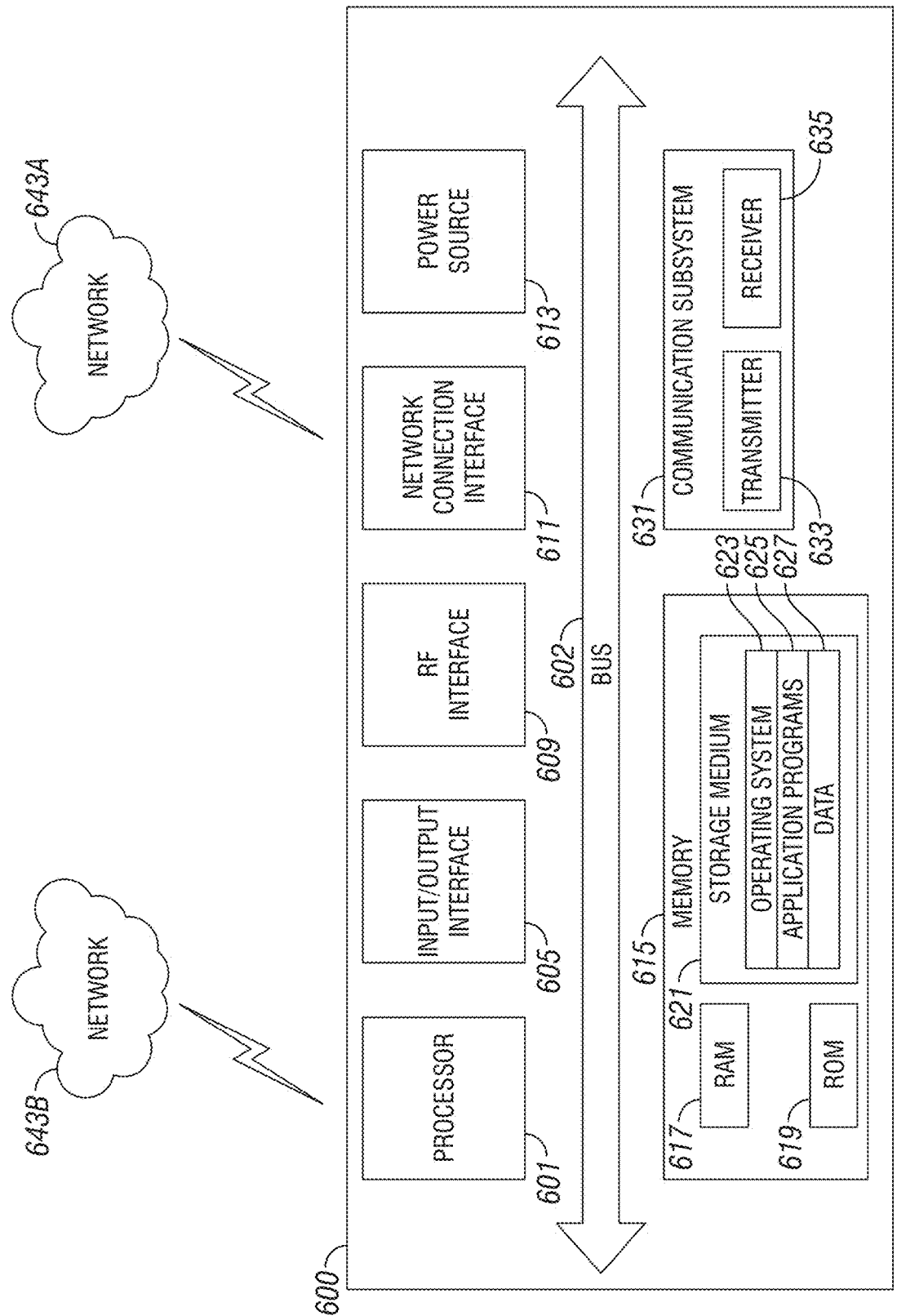
FIG. 6 illustrates an example user equipment, according to certain embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 600 may be any UE identified by the 3rd Generation Partnership Project (3GPP), including a NB-IoT UE, a MTC UE, and/or an enhanced MTC (eMTC) UE. UE 600, as illustrated in FIG. 6, is one example of a WD configured for communication in accordance with one or more communication standards promulgated by the 3rd Generation Partnership Project (3GPP), such as 3GPP's GSM, UMTS, LTE, and/or 5G standards. In certain embodiments, the user equipment 600 may be a user equipment which is further depicted in FIG. 17. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer. In certain embodiment, processing circuitry 601 may perform the method which is further illustrated in FIG. 15.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643b may encompass wired and/or wireless networks such as a local-area network (LAN), a wide-area network (WAN), a computer network, a wireless network, a telecommunications network, another like network or any combination thereof. For example, network 643b may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
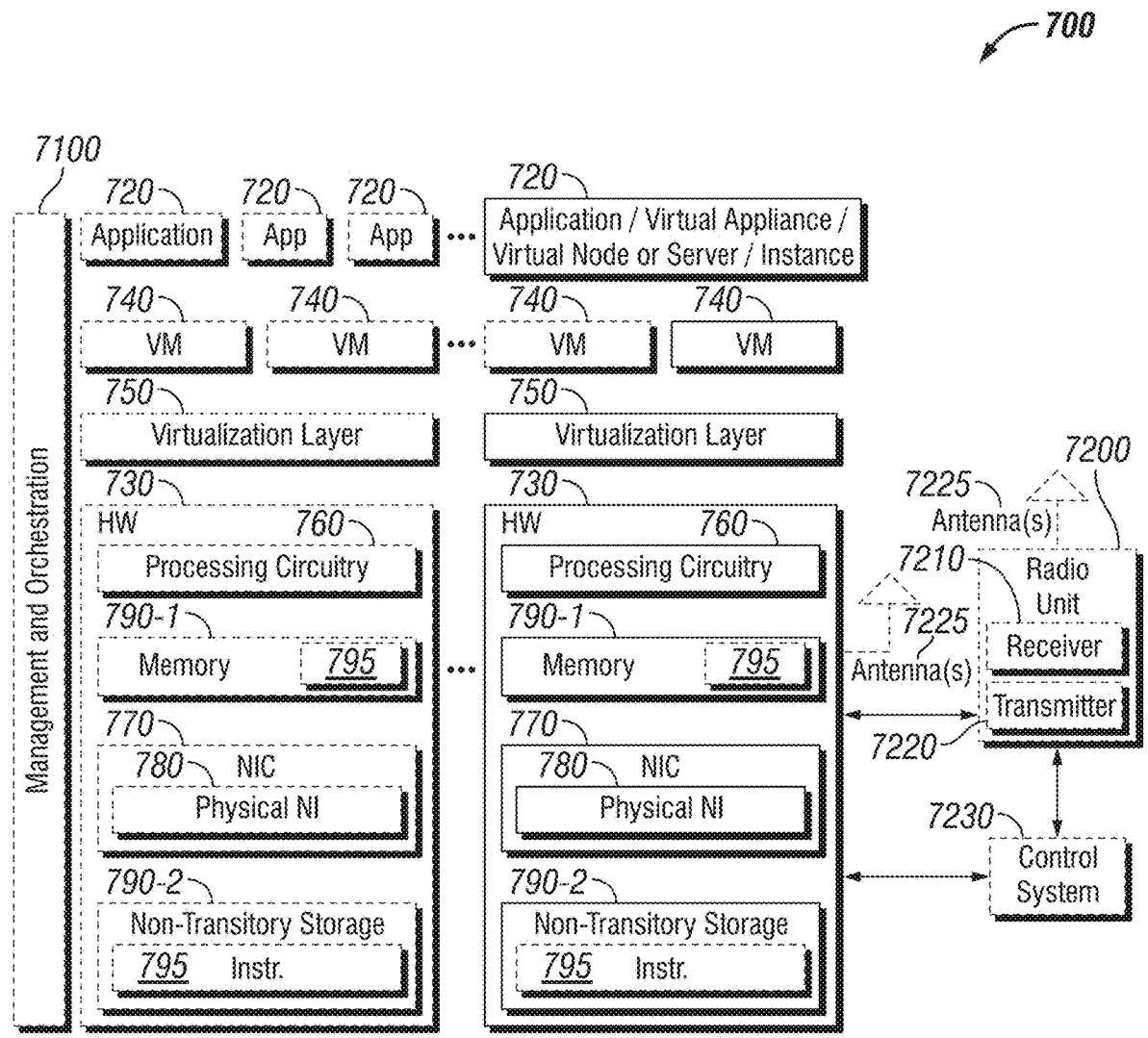
FIG. 7 illustrates an example virtualization environment, according to certain embodiments.

FIG. 7 illustrates an example virtualization environment, according to certain embodiments. FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signaling can be affected with the use of control system 7230 which may alternatively be used for communication between the hardware nodes 730 and radio units 7200.

Figure 8:
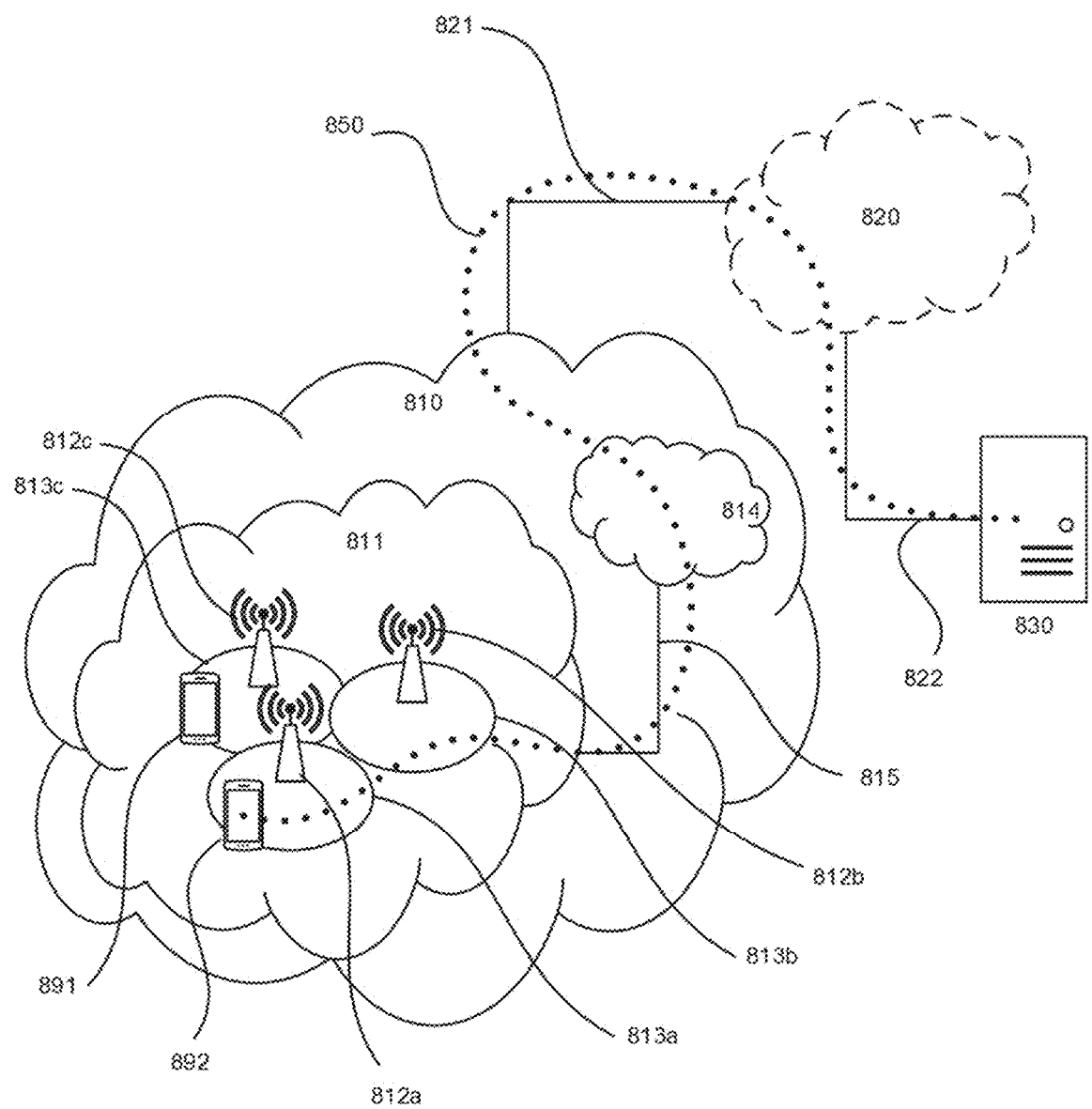
FIG. 8 illustrates an example telecommunication network connected via an intermediate network to a host computer, according to certain embodiments.

FIG. 8 illustrates an example telecommunication network connected via an intermediate network to a host computer, according to certain embodiments. With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812. In certain embodiments, the plurality of UEs 891, 892 may be the user equipment as described with respect to FIG. 17.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more subnetworks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Figure 9:
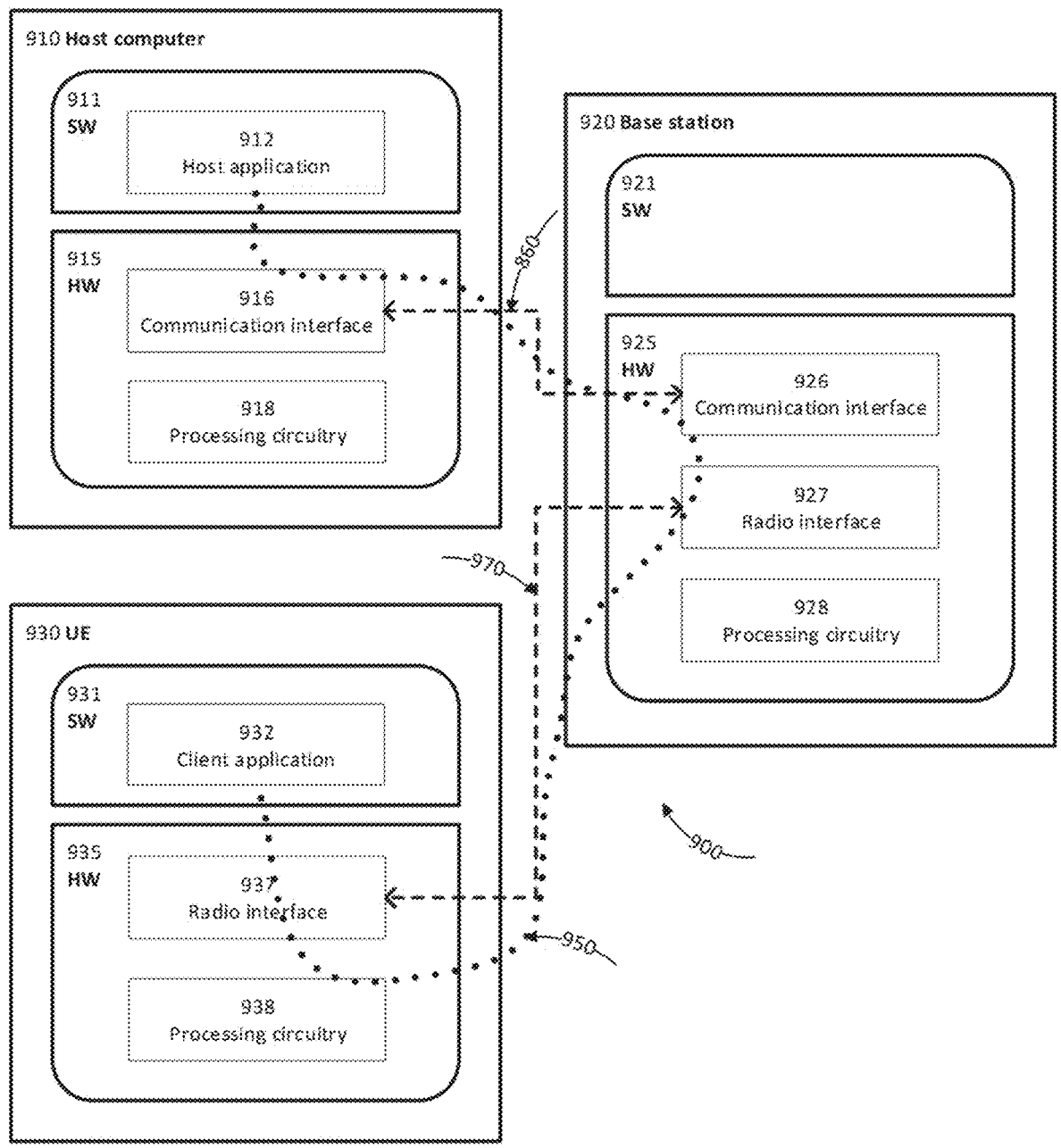
FIG. 9 illustrates an example host computer communicating via a base station with a user equipment over a partially wireless connection, according to certain embodiments.

FIG. 9 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. In certain embodiments, the base station 920 may be a network node as described with respect to FIG. 16. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. In certain embodiments, the UE 930 may be the user equipment as described with respect to FIG. 17. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
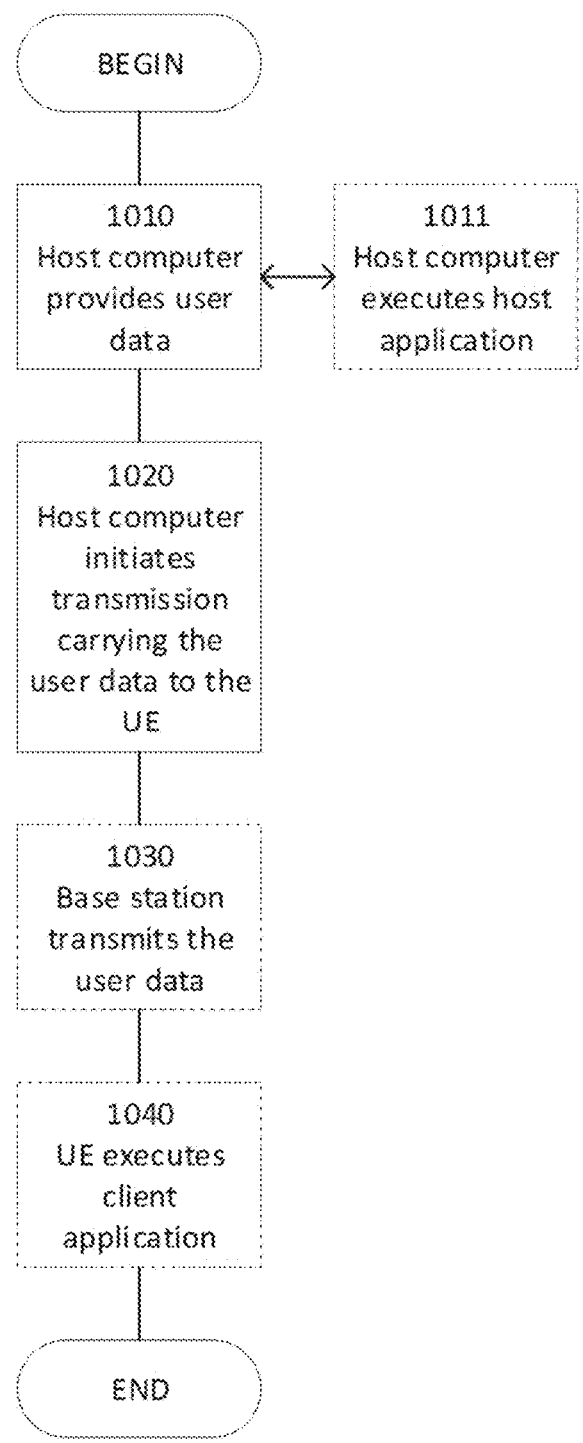
FIG. 10 illustrates an example method implemented in a communication system including a host computer, a base station and a user equipment, according to certain embodiments.

FIG. 10 illustrates an example method implemented in a communication system including a host computer, a base station and a user equipment, according to certain embodiments in accordance with some embodiments. More specifically, FIG. 10 is a flowchart illustrating a method implemented in a communication system, in accordance with one embodiment. The communication system includes a host computer, a base station and a UE which may be a user equipment described with reference to FIG. 17. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
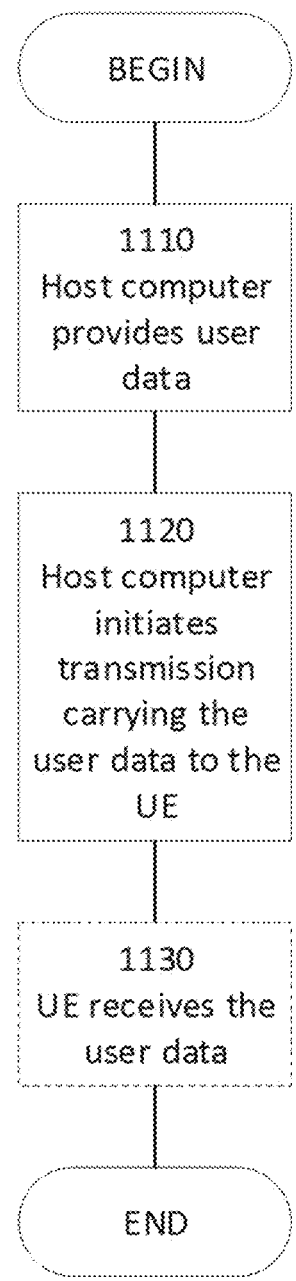
FIG. 11 illustrates another example method implemented in a communication system including a host computer, a base station and a user equipment, according to certain embodiments.

FIG. 11 illustrates an example method implemented in a communication system including a host computer, a base station and a user equipment, in accordance with some embodiments. More specifically, FIG. 11 is a flowchart illustrating a method implemented in a communication system, in accordance with one embodiment. The communication system includes a host computer, a base station and a UE which may be a user equipment described with reference to FIG. 17. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
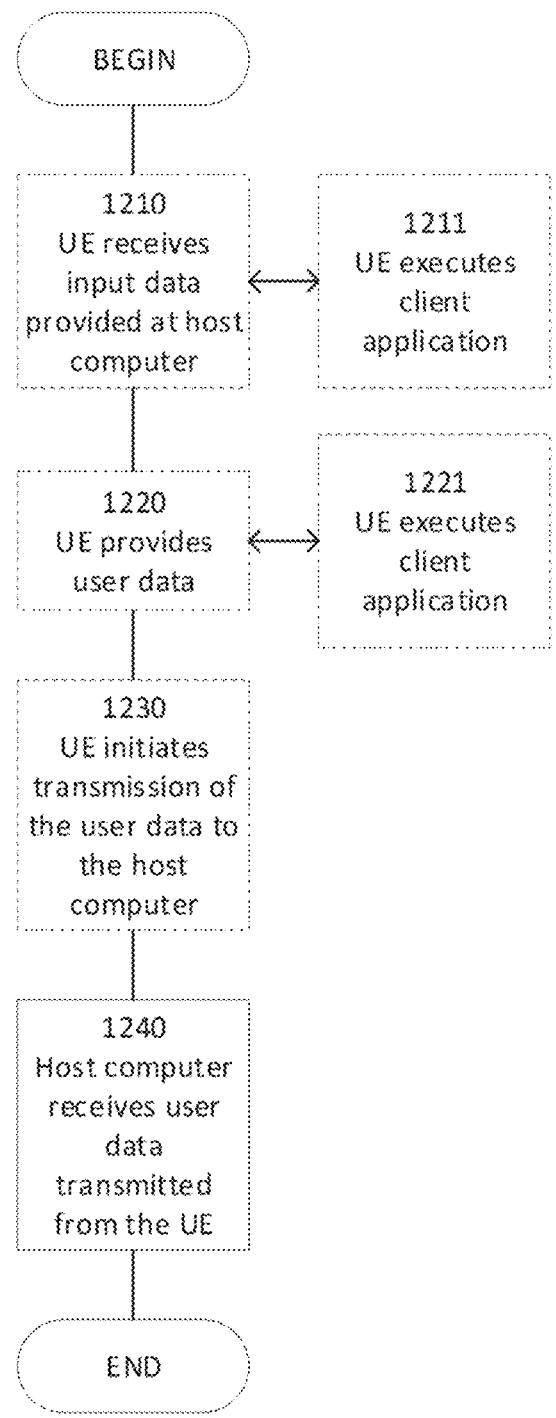
FIG. 12 illustrates another further example method implemented in a communication system including a host computer, a base station and a user equipment, according to certain embodiments.

FIG. 12 illustrates another further example method implemented in a communication system including a host computer, a base station and a user equipment, in accordance with some embodiments. More specifically, FIG. 12 is a flowchart illustrating a method implemented in a communication system, in accordance with one embodiment. The communication system includes a host computer, a base station and a UE which may be a user equipment described with reference to FIG. 17. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
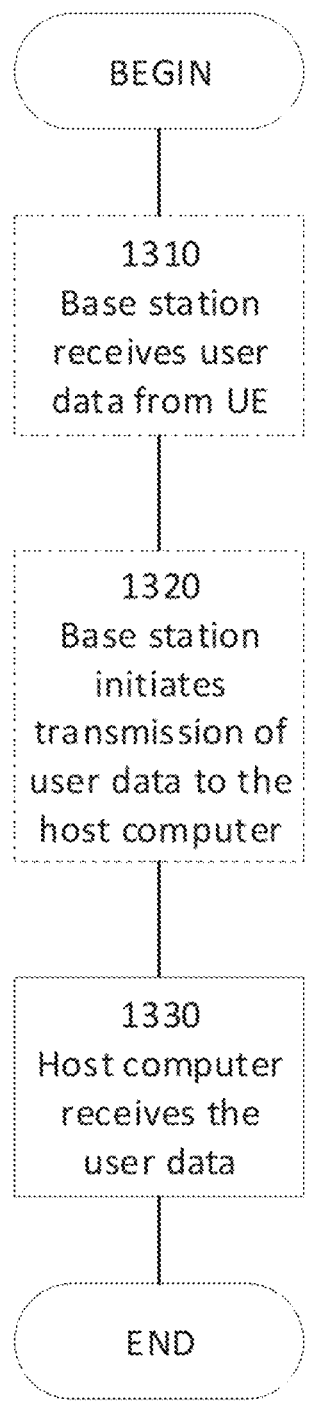
FIG. 13 illustrates another yet example method implemented in a communication system including a host computer, a base station and a user equipment, according to certain embodiments.

FIG. 13 illustrates another example method implemented in a communication system including a host computer, a base station and a user equipment, in accordance with some embodiments. More specifically, FIG. 13 is a flowchart illustrating a method implemented in a communication system, in accordance with one embodiment. The communication system includes a host computer, a base station and a UE which may be a user equipment described with reference to FIG. 17. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 14:
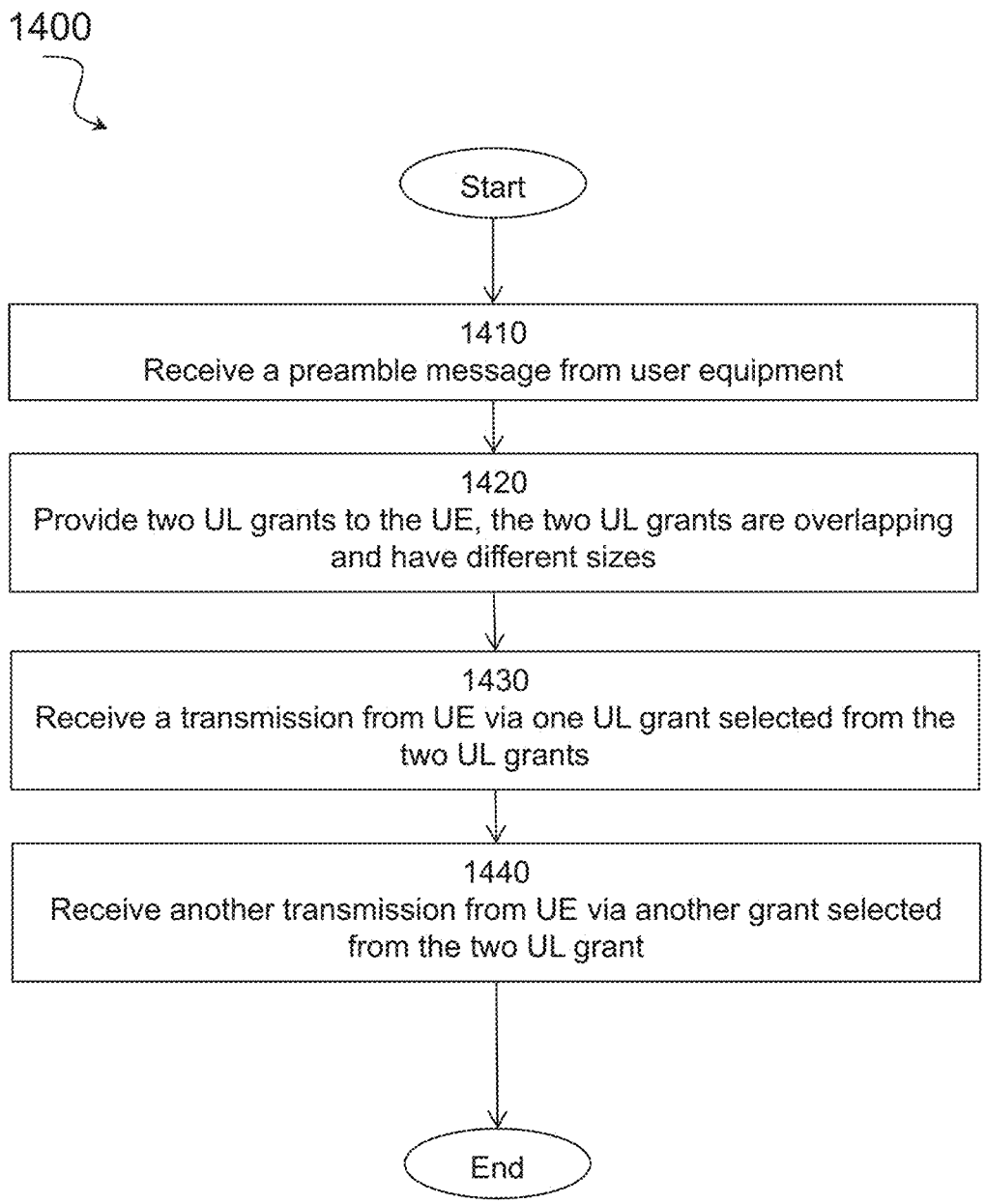
FIG. 14 illustrates a flow diagram of an example method, in accordance with certain embodiments.

FIG. 14 is a flow diagram of an example method, in accordance with certain embodiments. The method may be performed by a network node or a base station. The network node may be the network node 560 depicted in FIG. 5. The base station may be the base station depicted in FIGS. 8 and 9. Method 1400 begins at step 1410 with receiving, from a UE, a preamble message.

At step 1420, the method 1400 provides two UL grants to the UE. The two UL grants have different sizes and are overlapping. In certain embodiments, the two UL grants may be the first UL grant and the second UL grant. In certain embodiments, the network node may provide more than two UL grants to the UE. In certain embodiments, these UL grants may be provided in a system information message. In certain embodiments, the first UL grant may comprise at least one of the following: uplink subcarrier spacing, subcarrier indication, scheduling delay, repetition number, and modulation and coding scheme (MCS) index which indicates transport block size (TBS), modulation, and number of resource units (RUs). In certain embodiments, when the method 1400 is used for NB-IoT, the second UL grant may comprise at least one of the following: subcarrier indication, scheduling delay, repetition number, and modulation and coding scheme (MCS) index which indicates TBS, modulation, and number of RUs. In certain embodiments, when the method 1400 is used for eMTC, the second UL grant may comprise at least one of the following: physical uplink shared channel (PUSCH) narrowband index, PUSCH resource allocation, number of repetitions for PUSCH, MCS, TBS, transmit power control (TPC), channel state information (CSI) request, uplink delay, and MTC physical downlink control channel (MPDCCH) narrowband index. In certain embodiments, at least one field in the first UL grant may inherited by the second UL grant. In certain embodiments, fields in the second UL grant which are not inherited from the first UL grant may be presented by using unused bits in medium access control (MAC) protocol data unit (PDU) for the system information message. In certain embodiments, a number of bits used in the first UL grant is less than a number of bits used in the second UL grant, and wherein the first UL grant is used for legacy and the second UL grant which overlaps with legacy resources is used for early data transmission EDT.

At step 1430, the method 1400 receives a transmission from the UE via one UL grant selected from the two UL grants. In certain embodiments, the UE may be a UE which intends to use EDT. When the UE intends to use EDT, the UE selects a UL grant with a larger size. In certain embodiments, the UE may be a legacy UE which does not select a UL grant with a larger size.

At step 1440, the method 1400 further receives another transmission from the UE via another grant selected from the two UL grants.

Figure 15:
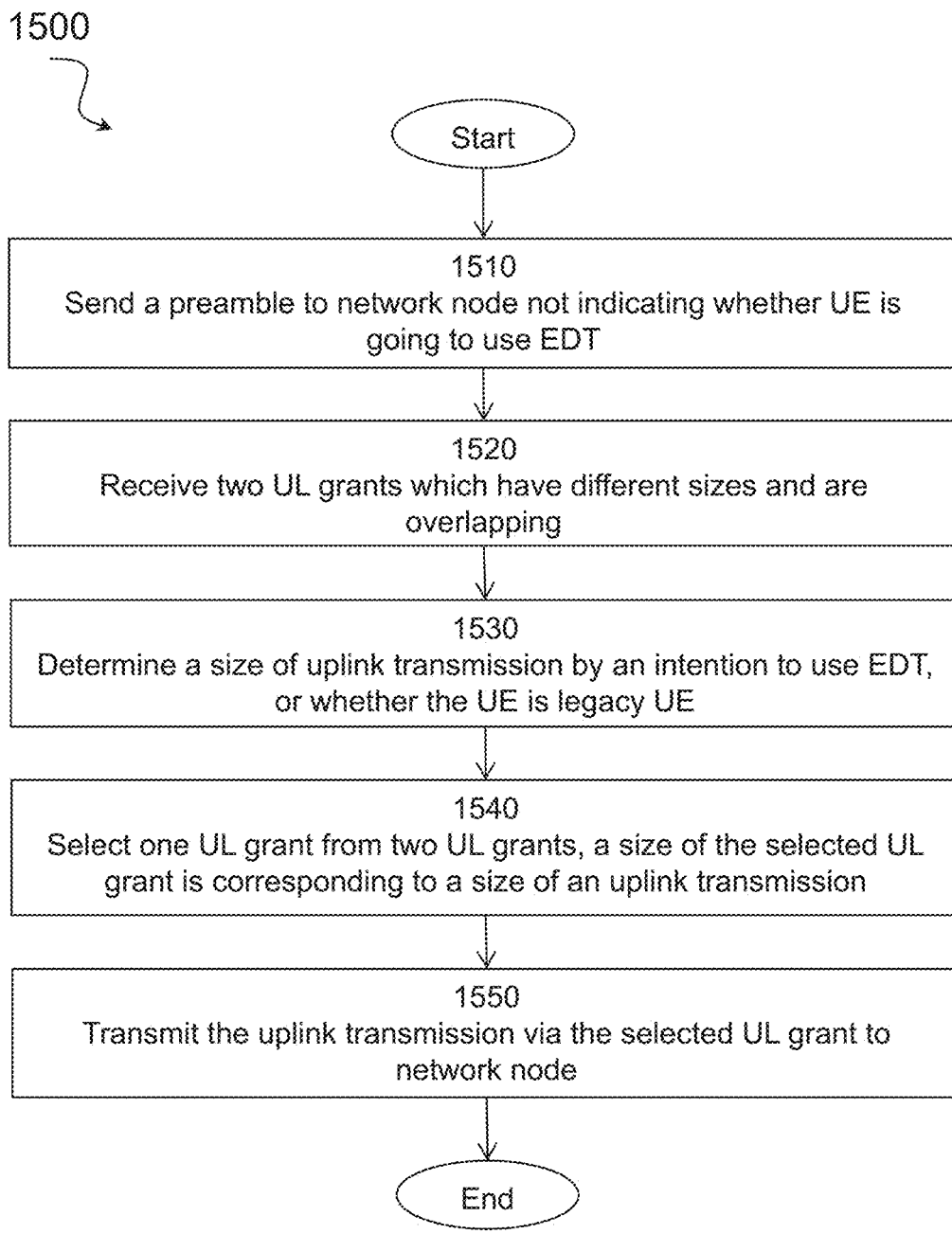
FIG. 15 illustrates a flow diagram of another example method, in accordance with certain embodiments.

FIG. 15 is a flow diagram of another example method, in accordance with certain embodiments. The method may be performed by a UE or a WD in a network. The user equipment may be the wireless device 510 depicted in FIG. 5 or the user equipment 600 shown in FIG. 6. The network node may be the network node 560 depicted in FIG. 5. The network may be the network 506 depicted in FIG. 5. Method 1500 begins at step 1510 with sending a preamble to network node. In certain embodiments, the preamble may not indicate whether UE is going to use EDT not.

At step 1520, the method 1500 receives two UL grants which have different sizes and are overlapping. In certain embodiments, the two UL grants may be a first UL grant and a second UL grant. In certain embodiments, the UE may receive more than two UL grants. In certain embodiments, these UL grants may be provided in a system information message. In certain embodiments, the first UL grant may comprise at least one of the following: uplink subcarrier spacing, subcarrier indication, scheduling delay, repetition number, and modulation and coding scheme (MCS) index which indicates transport block size (TBS), modulation, and number of resource units (RUs). In certain embodiments, when the method 1400 is used for NB-IoT, the second UL grant may comprise at least one of the following: subcarrier indication, scheduling delay, repetition number, and modulation and coding scheme (MCS) index which indicates TBS, modulation, and number of RUs. In certain embodiments, when the method 1400 is used for eMTC, the second UL grant may comprise at least one of the following: physical uplink shared channel (PUSCH) narrowband index, PUSCH resource allocation, number of repetitions for PUSCH, MCS, TBS, transmit power control (TPC), channel state information (CSI) request, uplink delay, and MTC physical downlink control channel (MPDCCH) narrowband index. In certain embodiments, at least one field in the first UL grant may inherited by the second UL grant. In certain embodiments, fields in the second UL grant which are not inherited from the first UL grant may be presented by using unused bits in medium access control (MAC) protocol data unit (PDU) for the system information message. In certain embodiments, a number of bits used in the first UL grant is less than a number of bits used in the second UL grant, and wherein the first UL grant is used for legacy and the second UL grant which overlaps with legacy resources is used for early data transmission EDT.

At step 1530, the method 1500 determines a size of uplink transmission by an intention to use EDT, or whether the UE is legacy UE.

At step 1540, the method 1500 selects one UL grant from two UL grants, wherein a size of the selected UL grant is corresponding to a size of an uplink transmission. When the UE intends to use EDT, the UE selects a UL grant with a larger size. In certain embodiments, the UE may be a legacy UE which does not select a UL grant with a larger size. In certain embodiments, fields in the second UL grant become dependent on the first UL grant as the UE selects or receives the first UL grant.

At step 1550, the method 1500 transmits the uplink transmission, the first transmission, via the selected UL grant, the first UL grant, to the network node. In certain embodiments, the method 1500 may further transmit another transmission via the other UL grant, the second UL grant, to the network node. The scheduling delay in the second uplink resource grant is with respect to an end of the first transmission plus a specific time offset or after the UE confirms that the first transmission has been received by the network node. In certain embodiments, the specific time offset is 3 ms. In certain embodiments, the network may enable a specific scheduling delay between the first uplink resource grant and the second uplink resource grant.

Figure 16:
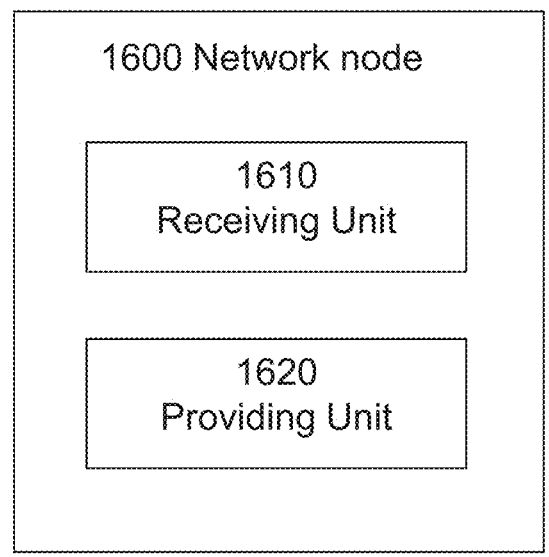
FIG. 16 illustrates a block schematic of an example network node, in accordance with certain embodiments.

FIG. 16 is a schematic block diagram of an exemplary network node 1600 in a wireless network, in accordance with certain embodiments. In some embodiments, the wireless network may be the wireless network 506 shown in FIG. 5. The network node may be implemented in a wireless device (e.g., wireless device 510 shown in FIG. 5). The network node 1600 is operable to carry out the example method described with reference to FIG. 14 and possibly any other processes or methods disclosed herein. It is also to be understood that the method of FIG. 14 is not necessarily carried out solely by the network node 1600. At least some operations of the method can be performed by one or more other entities.

Network node 1600 may comprise processing circuitry, which may include one or more microprocessor or microcontrollers, as well as other digital hardware, which may include digital signal processors (DSPs), special-purpose digital logic, and the like. In some embodiments, the processing circuitry of the network node 1600 may be the processing circuitry 570 shown in FIG. 5. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1610, and providing 1620, and any other suitable units of network node 1600 to perform corresponding functions according one or more embodiments of the present disclosure, such as a receiver and a transmitter.

As illustrated in FIG. 16, network node 1600 includes receiving unit 1610, and providing 1620. Receiving unit 1610 may be configured to receive, from a UE, a preamble message.

Providing unit 1620 may be configured to provide two UL grants to the UE, the two UL grants have different sizes and are overlapping. In certain embodiments, the two UL grants may be the first UL grant and the second UL grant. In certain embodiments, the network node may provide more than two UL grants to the UE. In certain embodiments, these UL grants may be provided in a system information message. In certain embodiments, the first UL grant may comprise at least one of the following: uplink subcarrier spacing, subcarrier indication, scheduling delay, repetition number, and modulation and coding scheme (MCS) index which indicates transport block size (TBS), modulation, and number of resource units (RUs). In certain embodiments, when the network node 1600 is used for NB-IoT, the second UL grant may comprise at least one of the following: subcarrier indication, scheduling delay, repetition number, and modulation and coding scheme (MCS) index which indicates TBS, modulation, and number of RUs. In certain embodiments, when the network node 1600 is used for eMTC, the second UL grant may comprise at least one of the following: physical uplink shared channel (PUSCH) narrowband index, PUSCH resource allocation, number of repetitions for PUSCH, MCS, TBS, transmit power control (TPC), channel state information (CSI) request, uplink delay, and MTC physical downlink control channel (MPDCCH) narrowband index. In certain embodiments, at least one field in the first UL grant may inherited by the second UL grant. In certain embodiments, fields in the second UL grant which are not inherited from the first UL grant may be presented by using unused bits in medium access control (MAC) protocol data unit (PDU) for the system information message. In certain embodiments, a number of bits used in the first UL grant is less than a number of bits used in the second UL grant, and wherein the first UL grant is used for legacy and the second UL grant which overlaps with legacy resources is used for early data transmission EDT.

Receiving unit 1610 may be further configured to receive a transmission from the UE via one UL grant selected from the two UL grants. In certain embodiments, the UE may be a UE which intends to use EDT. When the UE intends to use EDT, the UE selects a UL grant with a larger size. In certain embodiments, the UE may be a legacy UE which does not select a UL grant with a larger size.

Receiving unit 1610 may be further configured to receive another transmission from the UE via another grant selected from the two UL grants.

Figure 17:
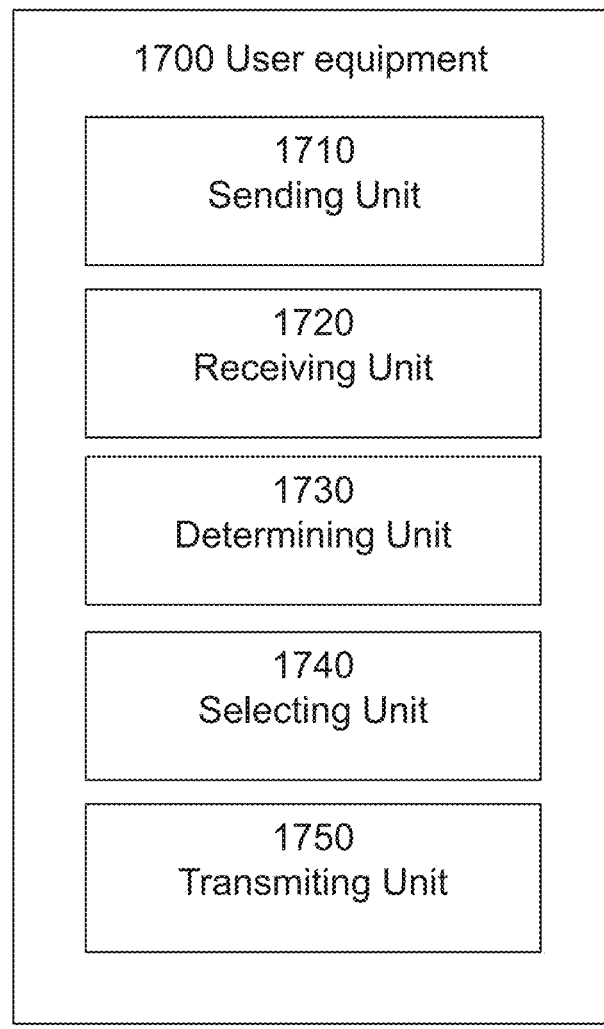
FIG. 17 illustrates a block schematic of an example user equipment, in accordance with certain embodiments.

FIG. 17 is a schematic block diagram of an exemplary user equipment 1700, in accordance with certain embodiments. The user equipment 1700 may be used in a wireless network, e.g. the wireless network 506 shown in FIG. 5. In certain embodiments, the user equipment 1700 may be implemented in a wireless device 510 shown in FIG. 5. The user equipment 1700 is operable to carry out the example method described with reference to FIG. 15 and possibly any other processes or methods disclosed herein. It is also to be understood that the method in FIG. 15 are not necessarily carried out solely by user equipment 1700. At least some operations of the method can be performed by one or more other entities.

User equipment 1700 may comprise processing circuitry, which may include one or more microprocessor or microcontrollers, as well as other digital hardware, which may include digital signal processors (DSPs), special-purpose digital logic, and the like. In some embodiments, the processing circuitry of user equipment 1500 may be the processing circuitry 520 shown in FIG. 5. In some embodiments, the processing circuitry of user equipment 1700 may be the processor 601 shown in FIG. 6. The processing circuitry may be configured to execute program code stored in memory 615 shown in FIG. 6, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause sending unit 1710, receiving unit 1720, determining unit 1730, selecting unit 1740, and transmitting unit 1750, and any other suitable units of user equipment 1500 to perform corresponding functions according one or more embodiments of the present disclosure, such as a transmitter and a receiver.

As illustrated in FIG. 17, user equipment 1700 includes sending unit 1710, receiving unit 1720, determining unit 1730, selecting unit 1740, and transmitting unit 1750. The sending unit 1710 may be configured to send a preamble to network node. In certain embodiments, the preamble may not indicate whether UE is going to use EDT not.

Receiving unit 1720 may be configured to receive two UL grants having different sizes and are overlapping. In certain embodiments, the two UL grants may be a first UL grant and a second UL grant. In certain embodiments, the receiving unit 1720 may receive more than two UL grants. In certain embodiments, these UL grants may be provided in a system information message. In certain embodiments, the first UL grant may comprise at least one of the following: uplink subcarrier spacing, subcarrier indication, scheduling delay, repetition number, and modulation and coding scheme (MCS) index which indicates transport block size (TBS), modulation, and number of resource units (RUs). In certain embodiments, when the UE 1700 is used for NB-IoT, the second UL grant may comprise at least one of the following: subcarrier indication, scheduling delay, repetition number, and modulation and coding scheme (MCS) index which indicates TBS, modulation, and number of RUs. In certain embodiments, when the UE 1700 is used for eMTC, the second UL grant may comprise at least one of the following: physical uplink shared channel (PUSCH) narrowband index, PUSCH resource allocation, number of repetitions for PUSCH, MCS, TBS, transmit power control (TPC), channel state information (CSI) request, uplink delay, and MTC physical downlink control channel (MPDCCH) narrowband index. In certain embodiments, at least one field in the first UL grant may inherited by the second UL grant. In certain embodiments, fields in the second UL grant which are not inherited from the first UL grant may be presented by using unused bits in medium access control (MAC) protocol data unit (PDU) for the system information message. In certain embodiments, a number of bits used in the first UL grant is less than a number of bits used in the second UL grant, and wherein the first UL grant is used for legacy and the second UL grant which overlaps with legacy resources is used for early data transmission EDT.

Determining unit 1730 may be configured to determine a size of uplink transmission by an intention to use EDT, or whether the UE is legacy UE.

Selecting unit 1740 may be configured to select one UL grant from two UL grants, wherein a size of the selected UL grant is corresponding to a size of an uplink transmission. When the UE 1700 intends to use EDT, the UE 1700 selects a UL grant with a larger size. In certain embodiments, the UE 1700 may be a legacy UE which does not select a UL grant with a larger size. In certain embodiments, fields in the second UL grant become dependent on the first UL grant as the UE 1700 selects or receives the first UL grant.

Transmitting unit 1750 may be configured to transmit the uplink transmission, the first transmission, via the selected UL grant, the first UL grant, to the network node. In certain embodiments, the UE 1700 may further be configured to transmit another transmission via the other UL grant, the second UL grant, to the network node. The scheduling delay in the second uplink resource grant is with respect to an end of the first transmission plus a specific time offset or after the UE confirms that the first transmission has been received by the network node. In certain embodiments, the specific time offset is 3 ms. In certain embodiments, the network may be configured to enable a specific scheduling delay between the first uplink resource grant and the second uplink resource grant.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, advantages of features herein is that minimizing the overhead of the random access response message (Msg2), and fitting the size of the UL grant to the size of the data UE intends to transmit in the connection request message (Msg3). The method in the present disclosure reduces resource waste and power consumption.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for allocating a resource grant at a network node comprising:
    receiving, from a user equipment, UE, a preamble message;
    providing, to the UE, at least two uplink resource grants in a system information message, wherein the at least two uplink resource grants have different transport block sizes and are overlapping, the at least two uplink grants for use transmitting a message 3 transmission, wherein the at least two uplink grants use the same frequency; and
    receiving, from the UE, the message 3 transmission via a first uplink resource grant selected from the at least two uplink resource grants, wherein a size of the first uplink resource grant corresponds to a size of the transmission.

2. The method according to claim 1, wherein the at least two uplink resource grants comprise the first uplink resource grant and a second uplink resource grant.

3. The method according to claim 1, wherein the UE is a UE which intends to use early data transmission.

4. The method according to claim 2, wherein:
    at least one field in the first uplink resource grant is inherited by the second uplink resource grant; and
    optionally wherein fields in the second uplink resource grant which are not inherited from the first uplink resource grant are presented by using unused bits in medium access control, MAC, protocol data unit, PDU, for the system information message.

5. The method according to claim 2, wherein a number of bits used in the first uplink resource grant is less than a number of bits used in the second uplink resource grant, and wherein:
    the first uplink resource grant is used for legacy and the second uplink resource grant which overlaps with legacy resources is used for early data transmission.

6. A method for allocating a resource grant in a network comprising:

sending, from a user equipment, UE, to a network node, a preamble message;

receiving, at the UE from the network node, at least two uplink resource grants in a system information message, wherein the at least two uplink resource grants have different transport block sizes and are overlapping, the at least two uplink grants for use transmitting a message 3 transmission, wherein the at least two uplink grants use the same frequency;

selecting, at the UE, a first uplink resource grant from the at least two uplink resource grants, wherein a size of the first uplink resource grant is corresponding to a size of a first message 3 transmission; and transmitting, from the UE to the network node, the first message 3 transmission.

7. The method according to claim 6, further comprising selecting a second uplink resource grant from the at least two uplink resource grants, wherein a size of the second uplink resource grant is corresponding to a size of a second transmission.

8. The method according to claim 7, wherein as the UE receives the first uplink resource grant, fields in the second uplink resource grant become dependent on the first uplink resource grant.

9. The method according to claim 6, wherein the first uplink resource grant comprises at least one of the following:
uplink subcarrier spacing;
subcarrier indication;
scheduling delay;
repetition number; and
modulation and coding scheme, MCS, index which indicates transport block size, TBS, modulation, and number of resource units, RUs.

10. The method according to claim 7, wherein the second uplink resource grant comprises at least one of the following:
subcarrier indication;
scheduling delay;
repetition number; and
modulation and coding scheme, MCS, index which indicates TBS, modulation, and number of Rus; and optionally wherein the scheduling delay in the second uplink resource grant is with respect to an end of first transmission plus a specific time offset or after the UE confirms that the first transmission has been received by the network node.

11. The method according to claim 7, wherein the second uplink resource grant comprises at least one of the following:
physical uplink shared channel, PUSCH, narrowband index;
PUSCH resource allocation;
Number of repetitions for PUSCH;
MCS;
TBS;
transmit power control, TPC;
channel state information, CSI, request;
uplink delay; and
MTC physical downlink control channel, MPDCCH, narrowband index.

12. The method according to claim 7, wherein the network enables a specific scheduling delay between the first uplink resource grant and the second uplink resource grant.

13. The method according to claim 10, wherein the specific time offset is 3 ms.

14. A network node for allocating a resource grant in a network, comprising:
at least one processing circuitry; and
at least one storage that stores processor-executable instructions, when executed by the processing circuitry, causes the network node to:
receive, from a user equipment, UE, a preamble message;
provide, to the UE, at least two uplink resource grants in a system information message, wherein the at least two uplink resource grants have different transport block sizes and are overlapping, the at least two uplink grants for use transmitting a message 3 transmission, wherein the at least two uplink grants use the same frequency; and
receive, from the UE, the message 3 transmission via a first uplink resource grant selected from the at least two uplink resource grants, wherein a size of the first uplink resource grant corresponds to a size of the first transmission.

15. A user equipment for allocating a resource grant in a network, comprising:
at least one processing circuitry; and
at least one storage that stores processor-executable instructions, when executed by the processing circuitry, causes the user equipment to:
send, to a network node, a preamble message;
receive, from the network node, at least two uplink resource grants in a system information message, wherein the at least two uplink resource grants have different transport block sizes and are overlapping, the at least two uplink grants for use transmitting a message 3 transmission, wherein the at least two uplink grants use the same frequency;
select a first uplink resource grant from the at least two uplink resource grants, wherein a size of the first uplink resource grant is corresponding to a size of a first message 3 transmission; and
transmit, to the network node, the first message 3 transmission.

16. The user equipment according to claim 15, wherein the processor-executable instructions, when executed by the processing circuitry, further cause the user equipment to select a second uplink resource grant from the at least two uplink resource grants, wherein a size of the second uplink resource grant is corresponding to a size of a second transmission.

17. The user equipment according to claim 16, wherein as the UE receives the first uplink resource grant, fields in the second uplink resource grant become dependent on the first uplink resource grant.

18. The user equipment according to claim 15, wherein the first uplink resource grant comprises at least one of the following:
uplink subcarrier spacing;
subcarrier indication;
scheduling delay;
repetition number; and
modulation and coding scheme, MCS, index which indicates transport block size, TBS, modulation, and number of resource units, RUs.

19. The user equipment according to claim 16, wherein the second uplink resource grant comprises at least one of the following:
subcarrier indication;
scheduling delay;
repetition number; and modulation and coding scheme, MCS, index which indicates TBS, modulation, and number of Rus; and optionally wherein the scheduling delay in the second uplink resource grant is with respect to an end of first transmission plus a specific time offset or after the UE confirms that the first transmission has been received by the network node.

20. The user equipment according to claim 16, wherein the second uplink resource grant comprises at least one of the following:

physical uplink shared channel, PUSCH, narrowband index;
PUSCH resource allocation;
Number of repetitions for PUSCH;
MCS;
TBS;
transmit power control, TPC;
channel state information, CSI, request;
uplink delay; and
MTC physical downlink control channel, MPDCCH, narrowband index.

21. The user equipment according to claim 16, wherein the network enables a specific scheduling delay between the first uplink resource grant and the second uplink resource grant.

22. The user equipment according to claim 19, wherein the specific time offset is 3 ms.

* * * * *